United States Patent [19]

Hoxmeier

[11] Patent Number: 6,136,872
[45] Date of Patent: Oct. 24, 2000

[54] FREEZE-DRIED POLYSTYRENE-POLYSILOXANE FOAMS

[75] Inventor: Ronald James Hoxmeier, Houston, Tex.

[73] Assignee: Shell Oil Company, Houston, Tex.

[21] Appl. No.: 09/442,159

[22] Filed: Nov. 16, 1999

Related U.S. Application Data

[60] Provisional application No. 60/109,174, Nov. 20, 1998.

[51] Int. Cl.[7] ................... C08J 9/26; C08J 9/28
[52] U.S. Cl. ............... 521/61; 525/106; 528/25; 521/139; 521/146; 521/154
[58] Field of Search .............. 521/61, 146, 154, 521/139; 528/25; 525/106

[56] References Cited

U.S. PATENT DOCUMENTS

| | | | |
|---|---|---|---|
| 3,812,224 | 5/1974 | Smith et al. ................. | 264/28 |
| 4,118,449 | 10/1978 | Rinde ......................... | 264/28 |
| 4,261,937 | 4/1981 | Rinde ......................... | 264/28 |
| 4,673,695 | 6/1987 | Aubert et al. ................ | 521/64 |
| 4,810,570 | 3/1989 | Rutten et al. ............... | 428/318.6 |
| 5,362,761 | 11/1994 | Uragami et al. ............. | 521/64 |
| 5,618,903 | 4/1997 | Hoxmeir et al. ............. | 528/25 |
| 5,733,538 | 3/1998 | Riffle ......................... | 525/231 |
| 6,020,426 | 2/2000 | Yamaguchi et al. ......... | 528/99 |

FOREIGN PATENT DOCUMENTS

| | | |
|---|---|---|
| 56-028604 | 3/1981 | Japan . |
| 01115406 | 5/1989 | Japan . |
| 03080925 | 4/1991 | Japan ............ B01D 71/70 |

*Primary Examiner*—Morton Foelak
*Attorney, Agent, or Firm*—Donald F. Haas

[57] ABSTRACT

The present invention is a freeze-dried polystyrene-polysiloxane foam having a density of 0.05 to 0.8 grams per cubic centimeter and a void volume of 20 to 99 percent. These foams exhibit good compressibility and rebound and are useful in insulation and sound-deadening applications.

2 Claims, No Drawings

FREEZE-DRIED POLYSTYRENE-POLYSILOXANE FOAMS

This application claims the benefit of U.S. Provisional Application No. 60/109,174, filed Nov. 20, 1998, the entire disclosure of which is hereby incorporated by reference.

FIELD OF THE INVENTION

This invention relates to foams formed from polystyrene-block copolymers.

BACKGROUND OF THE INVENTION

Silicone gel compositions have been used in a variety of products, including sunscreen gels, moisturizing creams, antiperspirant creams, liquid foundations, and hair gels. Known silicone gel compositions include compositions comprised of silicone oil and wax, silicone oil and silica, and silicone oil and polyoxyalkylene-containing organopolysiloxanes, such as described in European Published Patent Application No. 0,568,102. That application identifies a number of possibilities for components useful as the silicone oil including low and high viscosity diorganopolysiloxanes, including polydimethylsiloxane, cyclic siloxanes, cyclic siloxane solutions of polydimethylsiloxane gums, etc.

Linear block copolymers of polystyrene and polydimethylsiloxane have been synthesized, both by graft and block copolymerization. In block copolymerization of such linear polymers, polystyrene is produced by anionic polymerization with an organo lithium initiator and the living polymer (PS-Li+) created thereby is reacted with hexamethylcyclotrisiloxane, $(Me_2SiO)_3$, in the presence of a polar promoter wherein a block of polydimethylsiloxane grows on the end of the living vinyl aromatic hydrocarbon polymer block.

SUMMARY OF THE INVENTION

The present invention is a freeze-dried polystyrene-polysiloxane foam having a density of 0.01 to 0.8 grams per cubic centimeter and a void volume of 20 to 99 percent. These foams exhibit good compressibility and rebound and are useful in insulation and sound-deadening applications.

DETAILED DESCRIPTION OF THE INVENTION

The polystyrene-polysiloxane block copolymers of this invention and the method of making them are fully described in U.S. Pat. No. 5,618,903, which is herein incorporated by reference. In block copolymerization of, for example, linear polystyrene-polydimethylsiloxane polymers, polystyrene is produced by anionic polymerization with an organo lithium initiator and the living polymer (PS-Li+) created thereby is reacted with hexamethylcyclotrisiloxane, $(Me_2SiO)_3$, in the presence of a polar promoter wherein a block of polydimethylsiloxane grows on the end of the living vinyl aromatic hydrocarbon polymer block.

In general, when solution anionic techniques are used, polymers of anionically polymerizable monomers are prepared by contacting the monomer to be polymerized simultaneously or sequentially with an anionic polymerization initiator such as Group IA metals, their alkyls, amides, silanolates, naphthalides, biphenyls and anthracenyl derivatives. It is preferable to use an organo alkali metal (such as sodium or potassium) compound in a suitable solvent at a temperature within the range from −150° C. to 300° C. preferably at a temperature within the range from 0° C. to 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to 20 carbon atoms; and n is an integer of 1–4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Styrene in the desired amount is polymerized to the desired mole weight as described above. When the polymerization of the styrene is complete, living polystyrene blocks are present in the polymerization mixture. These are perfectly linear polystyrenealkyllithiums. These living polystyrenes can then be reacted with cyclic siloxane monomers $(R_1R_2SiO)_n$, where n=3–10, $R_1$ and $R_2$=alkyl ($C_1$–$C_{20}$), alkenyl ($C_2$–$C_{20}$), hydrogen, benzyl or phenyl (including alkyl substituted aromatics and polycyclics) and $R_1$ and $R_2$ can be the same or different. Specific siloxane monomers include $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_4$, $(PhHSiO)_5$, $(PhHSiO)_3$, $(vinylmethylSiO)_4$, $(vinylmethylSiO)_5$, $(vinylHSiO)_3$, $(vinylHSiO)_4$, $(vinylHSiO)_5$, $(vinylmethylSiO)_3$, $(PhMeSiO)_3$, $(PhMeSi)_4$, $(PhMeSiO)_5$. Mixtures of monomers can also be used. When a polydimethylsiloxane block is desired with RLi initiator, the monomer is preferably hexamethyl-cyclotrisiloxane (D3) or octamethylcyclotetrasiloxane (D4).

This polymerization is carried out in the presence of a polar promoter. Such promoters include but are not limited to diethers and/or diamines, such as diethylglyme and\or TMEDA, cyclic ethers such as tetrahydrofuran, and any promoter known to be useful in anionic polymerizations. Its purpose is to decrease the reaction time of the D3 polymerization. Preferably, this reaction is carried out at a temperature of from 30° C. to 120° C., the concentration of the cyclic siloxane monomer (described herein in terms of hexamethylcyclotrisiloxane) is from 1 to 80 percent by weight, and the amount of promoter used ranges from 100 ppm to essentially 100 percent by weight (i.e. the polar promoter is used as solvent). The temperature range is important because higher temperatures cause more rapid reaction. The promoter concentration range is important for the same reason. The reaction may be carried out at up to 80 weight percent solids, preferably 10 to 80 percent. This is advantageous because higher solids offer economic advantages because less solvent is necessary.

The living block copolymer can be recovered directly to give PS-PDMS-O-Li which is a living polymer and has not been terminated. One could manufacture and sell the living polymer itself to others that could then react it to form other polymers and/or add other functionalities. Termination of the polymer may be achieved by several conventional means. If desired, the polymer can be capped with $R_3R_4R_5$-SiX, e.g., to give PS-PDMS-Si$R_3R_4R_5$ where the R's can be alkyl, alkenyl ($C_2$–$C_{20}$, preferably a vinyl group because of its high reactivity), amino, alcohol, carboxylate, and other hetero atom containing functionalities, phenyl, benzyl, hydrogen, and the like, and can be the same or different, and X is halogen, preferably chlorine, or alkoxide, preferably $C_1$–$C_{20}$. It can be protonated with, e.g., acetic acid, to give PS-PDMS-OH. It can also be coupled with, e.g., SiCl$_4$, Me$_2$SiCl$_2$, HSi(OMe)$_3$ with coupling agent functionalities from 2 to about 12 to give (PS-PDMS)$_n$), where n=the number of coupling agent functionalities. The coupling or capping reaction can be carried out from 40 to 100° C. for 5 minutes to 1 hour, preferably 70 to 100° C. for about 10 to 15 minutes.

The block copolymers of this invention have an overall number average molecular weight of from 2000 to 250,000, preferably from 3000 to 100,000. The PS-polysiloxane block copolymers have a polystyrene content (PSC) of 60% or less, preferably 30% or less, by weight. The number average molecular weights of the polysiloxane blocks vary from 1000 to 250,000, preferably 1000 to 100,000. The number average molecular weights of the polystyrene blocks vary from 1000 to 30,000, preferably 5000 to 30,000.

The polystyrene-polysiloxane block copolymers are dissolved in liquid cyclic siloxane monomer or a hydrocarbon solvent if the polymer is already been made and separate from the polymerization solution. If not, the polymerization solution can be used at this point when cyclohexane is used as solvent.

The dissolved polymer is cooled to about 10° C. below its freezing point. Next, the frozen solution is exposed to vacuum at a temperature below the solvent freezing point (F.P.) to remove the solvent by sublimation. The material recovered is a polystyrenepolysiloxane foam having a density of 0.01 to 0.8 grams per cubic centimeter, preferably 0.05 to 0.1 grams per cubic centimeter, and a void volume of 20 to 99 percent, preferably 90 to 99%.

EXAMPLES

Example 1

A 5% by weight solution in cyclohexane of a block copolymer of polystyrene-polydimethylsiloxane (PS-PDMS), 33% coupled (PS-PDMS mole weights of 14,000 and 16,000 respectively) was prepared at room temperature. This solution was transferred to a cylindrical dish and cooled to −10 C. in a refrigerated compartment. Then high vacuum was applied to the frozen solution until all the solvent had sublimed from the polymer matrix (about 24 hours). This resulted in a PS-PDMS foam (density=0.05 g/cc) having good compressibility and rebound.

Example 2

A 10% by weight solution of the polymer in Example 1 was prepared at 150° C. in hexamethylcyclotrisiloxane (D$_3$) as solvent (M.P.=65° C.). This solution was cooled to room temperature resulting in a polymer/D$_3$ solid matrix. High vacuum was applied to this matrix until all the D$_3$ solvent had sublimed (about 1 week) This resulted in a PS-PDMS foam (density=0.05 g/cc) having good compressibility and rebound.

I claim:

1. A freeze-dried polystyrene-polysiloxane block copolymer foam having a density of 0.01 to 0.8 grams per cubic centimeter and a void volume of 20 to 99 percent.

2. The foam of claim 1 wherein the density is 0.05 to 0.1 grams per cubic centimeter and the void volume is 90 to 99 percent.

* * * * *